United States Patent
Waters et al.

(10) Patent No.: US 7,410,672 B2
(45) Date of Patent: Aug. 12, 2008

(54) WATER-RESISTANT PORCELAIN ENAMEL COATINGS AND METHOD OF MANUFACTURING SAME

(75) Inventors: James D Waters, Florence, KY (US); Ray O. Knoeppel, Hartland, WI (US); Glenn Pfendt, Florence, KY (US)

(73) Assignee: AOS Holding Company, Wilmington, DE (US)

( * ) Notice: Subject to any disclaimer, the term of this patent is extended or adjusted under 35 U.S.C. 154(b) by 0 days.

(21) Appl. No.: 10/190,957

(22) Filed: Jul. 8, 2002

(65) Prior Publication Data

US 2003/0082306 A1 May 1, 2003

Related U.S. Application Data

(63) Continuation-in-part of application No. 09/686,288, filed on Oct. 11, 2000, now abandoned.

(60) Provisional application No. 60/158,819, filed on Oct. 12, 1999.

(51) Int. Cl.
*B05D 3/02* (2006.01)

(52) U.S. Cl. .............. 427/376.2; 427/376.4; 427/376.5; 427/397.7

(58) Field of Classification Search .............. 427/376.2, 427/376.4, 376.5, 397.7
See application file for complete search history.

(56) References Cited

U.S. PATENT DOCUMENTS

| | | | |
|---|---|---|---|
| 3,871,890 A | 3/1975 | Eppler et al. | |
| 3,891,452 A * | 6/1975 | Low et al. ..................... | 501/15 |
| 4,265,929 A | 5/1981 | Wagner et al. | |
| 4,340,508 A | 7/1982 | Wahlers et al. | |
| 4,624,934 A | 11/1986 | Kokubu et al. | |
| 4,830,724 A | 5/1989 | Houle | |
| 4,973,564 A | 11/1990 | Chyung et al. | |
| 5,039,629 A | 8/1991 | Kakligian | |
| 5,137,848 A | 8/1992 | Barker et al. | |
| 5,179,047 A | 1/1993 | Chiba | |
| 5,221,645 A | 6/1993 | Drouot et al. | |
| 5,514,629 A | 5/1996 | Morena | |
| 5,516,733 A | 5/1996 | Morena | |
| 5,650,121 A | 7/1997 | Dody et al. | |
| 5,698,482 A | 12/1997 | Frank et al. | |
| 5,855,747 A | 1/1999 | Lusk | |
| 5,998,037 A * | 12/1999 | Sridharan et al. ........... | 428/472 |
| 6,001,494 A | 12/1999 | Kuchinski et al. | |

FOREIGN PATENT DOCUMENTS

| | | |
|---|---|---|
| EP | 0453897 | 4/1991 |
| GB | 1 014 242 | 12/1965 |
| GB | 1 384 890 | 2/1975 |
| JP | 56026744 | 3/1981 |
| JP | 57077041 | 5/1982 |
| JP | 63307141 | 12/1988 |
| JP | 03170346 | 7/1991 |
| JP | 09175833 | 7/1997 |
| WO | WO 01/27049 | 4/2001 |

OTHER PUBLICATIONS

Andrews, Andrew I., Ph.D., "Porcelain Enamels, The Preparation, Application, and Properties of Enamels", Second Edition, The Garrard Press, Champaign, Illinois (1961) Table of Porcelain Enamels.
Porcelain Enamel Institute, "Technical Manuals, Manual of Mill Additions", Nashville, Tennessee, PEI-402, p. 21 (pre-1997).
Database WPI, Section Ch, Week 200147, Derwent Publications Ltd., London, GB, Class L01, An 2001-28193 & AU 200 080 090 A (AOS Holding Co.), Apr. 23, 2001 Abstract.
Opposition Against European Patent No. 1,230,183 (Oct. 5, 2004). (English Translation).
Opposition Against European Patent No. 1,230,183 (Oct. 5, 2004).
Kyri, Hans Dr., Handbuch für Bayeremail, Bayer Rickmann GMBH, 1974. (German Version and English Translation).
Wratil, Josef Dr., Emails, Deutsche Borax Gesellschaft mbH, 1984. (German Version and English Translation).
Petzold, A., Email und Emailliertechnik, Springer-Verlag, ISBN 3 540 17747-7, 1987. (German Version and English Translation).
Vitreous Enamels Borax Holdings, Ltd., 1984.
Heibe Tips für warmes Wasser, Deutsches Email-Zentrum e.V. Dec. 1993. (German Version and English Translation).
Muhlenversatz der Wendel GmbH Emailfabrik vom, May 11, 1998. (German Version and English Translation).
Brokhaus Naturwissenschaften und Technik ISBN 3-7653-0357-7, S. 164, 1983. (German Version and English Translation).

* cited by examiner

*Primary Examiner*—Fred J. Parker
(74) *Attorney, Agent, or Firm*—Michael Best & Friedrich LLP

(57) ABSTRACT

A water-resistant porcelain enamel coating and method of making the same is provided. The porcelain enamel coating is prepared using a borosilicate glass frit, and mill additions of silica and a zirconia compound. The mixture is applied to a metal substrate and fired, resulting in a water-resistant coating that resists cracking and crazing. The coating is particularly useful in water heaters. In one embodiment, the coating comprises a fine zirconia compound having a median particle size of less than 10 microns.

49 Claims, No Drawings

WATER-RESISTANT PORCELAIN ENAMEL COATINGS AND METHOD OF MANUFACTURING SAME

CROSS REFERENCE TO RELATED APPLICATIONS

This application is a continuation-in-part application of and claims priority to U.S. patent application Ser. No. 09/686,288 filed on Oct. 11, 2000 now abandoned, which claims the benefit under 35 U.S.C. § 119 of U.S. Provisional Application No. 60/158,819, filed on Oct. 12, 1999. The subject matter of each of these applications is hereby fully incorporated by reference.

FIELD OF INVENTION

The invention relates to porcelain enamel coatings, and particularly, to water-resistant porcelain enamel coatings for use in water heaters.

BACKGROUND OF THE INVENTION

Porcelain enamel is subject to corrosion and dissolution by hot water. This can cause difficulties in applications such as hot water heaters. In a water heater, once the porcelain enamel coating protecting a metal substrate is dissolved through to the substrate, then the substrate corrodes rapidly and is perforated through. At this point the water heater must be replaced.

Attempts to improve the corrosion resistance of porcelain enamel have resulted in the use of various mill additions. However, mill additions that improve corrosion resistance tend to result in porcelain enamels that are subject to fish scaling or crazing.

Therefore, it would be desirable to have an improved porcelain enamel coating which is not only highly water-resistant, but also resists crazing or cracking.

SUMMARY OF THE INVENTION

It has been found that the use of mill additions containing a combination of zirconia compounds and silica improves the corrosion resistance of the porcelain enamel to hot water. In addition to good corrosion resistance, the coating adheres well to the metal substrate.

The invention provides a method of manufacturing a water-resistant porcelain enamel coating. The method comprises providing a ground glass; adding mill additions including silica and a zirconia compound to form a mixture; applying the mixture to a substrate; and firing the coated substrate to form the porcelain enamel coating. The resulting coating has good water-resistance properties, good adhesion to the substrate, and minimal cracking. Therefore, this coating is useful, for example, to increase the life of water heaters.

The invention also provides a porcelain enamel coating prepared by the above process, and a water heater coated with the porcelain enamel.

Other features and advantages of the invention will become apparent to those skilled in the art upon review of the following detailed description and claims.

In one aspect, the invention provides a method of manufacturing water-resistant porcelain enamel coating. The method comprises providing ground glass and adding mill additions to the ground glass to form a mixture, wherein the mill additions comprise silica and a zirconia compound. The mixture is applied to a metal substrate to form a coated substrate, and the coated substrate is fired to form the water-resistant porcelain enamel coating. The silica and zirconia compound mill additions may comprise at least about 25 and less than about 70 parts by weight per hundred parts by weight ground glass.

In another aspect, the invention provides a method of manufacturing a water-resistant porcelain enamel coating suitable for use on a water heater. The method comprises providing a ground borosilicate glass, and adding mill additions to the ground glass to form a mixture. The mill additions comprise (a) a zirconia compound constituting at least about 10 parts by weight per hundred parts by weight ground glass and (b) a silica compound. The mixture is applied to a water heater and the water heater is fired at a temperature of about 1000° F. to about 1700° F. to form the water-resistant porcelain enamel coating.

In yet a further aspect, the invention provides a method of manufacturing a water-resistant porcelain enamel coating. The method comprises providing ground glass, and adding mill additions to the ground glass to form a mixture. The mill additions comprise silica and a zirconia compound and the mixture comprises at least about 15 parts and less than about 60 parts by weight of the silica mill addition per hundred parts by weight of the ground glass. The method further comprises applying the mixture to a metal substrate to form a coated substrate, and firing the coated substrate at a temperature of about 1000 to 1700° F. (538-927° C.) to form the water-resistant porcelain enamel coating.

In another aspect, the invention provides a method of manufacturing a water-resistant porcelain enamel coating. The method comprises providing ground glass and adding mill additions to the ground glass to form a mixture. The mill additions comprise a zirconia compound including particles having a median particle size of less than about 10 microns. The mixture is applied to a metal substrate to form a coated substrate and the coated substrate is fired to form the water-resistant porcelain enamel coating. The substrate may a water heater.

In a further aspect, the invention provides a method of manufacturing a water-resistant porcelain enamel coating. The method comprises providing ground glass, and adding mill additions to the ground glass to form a mixture. The mill additions comprise a zirconia compound. The method further comprises applying the mixture to a metal substrate to form a coated substrate, and firing the coated substrate to form the water-resistant porcelain enamel coating. The zirconia compound mill additions may comprise at least about 10 and less than about 120 parts by weight per hundred parts by weight ground glass. The substrate may be a water heater.

DETAILED DESCRIPTION OF THE INVENTION

Before embodiments of the invention are explained in detail, it is to be understood that the invention is not limited in its application to the details of the composition or concentration of components or to the steps or acts set forth in the following description. The invention is capable of other embodiments and of being practiced or being carried out in various ways. Also, it is understood that the phraseology and terminology used herein is for the purpose of description and should not be regarded as limiting.

Processes of making porcelain enamel coatings are well known in the art. The process generally includes blending inorganic minerals and smelting the blend to form a red hot molten mixture. The molten mixture is poured from the smelter and quenched, for example, between water cooled rollers. The ribbon of glass may then be shattered to form glass frit.

The resulting frit (or glass) may then be ground, for example, in a ball mill to reduce the frit to a predetermined particle size for the desired application. The grinding may be carried out wet or dry; typically, the grinding is carried out using water as the suspending medium.

Various mill additions may be added to the ground frit. Typical mill additions include suspending agents, electrolytes, refractories, colors and opacifiers, and/or bisque strengtheners. The resulting mixture may then be applied to a substrate by any one of various application methods customary in the art, such as, brushing, dipping, spraying, etc. The coated substrate is then fired in a conventional furnace at a temperature at which the glass frit softens, but below the melting point of the metal substrate. Upon cooling, the vitreous enamel layer hardens to adhere to the substrate.

More specifically, the porcelain enamel coating of the invention may be prepared by providing ground glass; adding to the ground glass mill additions including a zirconia compound and silica ($SiO_2$) to form a mixture, applying the mixture to a metal substrate, and firing to form a porcelain enamel coating. In order to improve the water resistance of the porcelain enamel, a balance must be achieved between reducing the size and quantity of undesirable voids in the coating which facilitate corrosion, and maintaining sufficient bubble structure to avoid cracking or crazing. Hydrogen gas tends to escape from coated steel substrates which can cause cracking and crazing in coatings with insufficient bubble structure. This balance may be achieved with mill additions including an appropriate combination of a) silica and b) a zirconia compound.

The form of the silica or zirconia compound mill additions is not significant. Regarding the silica mill additions, silica ($SiO_2$) and silicon carbide (SiC) may be suitable; silica is preferred. The silica mill addition is preferably present in an amount of greater than approximately 15 parts per hundred parts frit; more preferably greater than about 25 parts per hundred parts frit. All parts are given by weight unless otherwise indicated. The silica mill addition is preferably present in an amount less than about 60 parts per hundred parts frit; more preferably less than about 50 parts per hundred parts frit.

The mill additions of a zirconia compound are preferably added in an amount of greater than approximately 10 parts per hundred parts frit based on the total weight of the mixture. The zirconia compounds are preferably added in an amount less than about 40 parts per hundred parts frit; more preferably less than about 30 parts per hundred parts frit. The combined total parts of the silica and zirconia compound mill additions is preferably less than about 70; the combined total parts is preferably greater than about 25 parts per hundred parts frit, more preferably greater than about 35 parts per hundred parts frit.

With respect to the zirconia compounds, zircon ($ZrO_2.SiO_2$) and zirconia ($ZrO_2$) may be suitable. Zircon is preferred. Employing finer particle sizes of the zirconia compound may permit an increase in the quantity of zirconia compound which may be employed. This, in turn, may increase the water resistance of the coating. Particle sizes of 200 mesh or finer are preferred.

Other mill additions may also be included, such as clay, magnesium carbonate, sodium nitrite, borax, boric acid, potassium phosphate, potassium silica fluoride, or other mill additions customary for a particular application. Such mill additions are typically added in an amount of approximately 1 to 32 parts per 100 parts frit and are generally added to improve the workability of the coating before firing. Clay in an amount of about 5 weight percent (based on the total weight of the mixture) is preferred.

The glass frit may be any of the well-known compositions used for making vitreous porcelain enamel. However, it has been found preferable to use a borosilicate glass frit and particularly an alkaline earth borosilicate frit, such as a sodium borosilicate glass. The glass is preferably lead-free.

Optionally, the composition of the glass frit may be modified to have lower water solubility by decreasing the fluorine and calcium contents, and by increasing the lithium content. Specifically, a glass system comprising primarily silica ($SiO_2$), $Na_2O$ and zirconia ($ZrO_2$) with several additional oxides, may be modified to decrease the $F_2$ content, decrease the CaO content and increase the $Li_2O$ content. For example, a desirable ground glass system comprises about 52 weight percent $SiO_2$, about 17 weight percent $Na_2O$, about 10 weight percent $ZrO_2$, less than about 4.1 weight percent $F_2$, less than about 0.005 weight percent CaO, and greater than about 4.1 weight percent $Li_2O$.

The mixture of frit and mill additions is applied to a substrate. The substrate is a metal and is preferably a steel. Most preferably, the substrate is a water heater. A preferred class of deposition techniques includes wet deposition techniques wherein the components of the coating are put into a liquid suspension, or "slip", and then applied to the substrate using various wet application methods. For enamels being applied by a wet process, water is preferably used as the suspension medium. The coating thickness should be thin enough to permit gas to escape from the substrate. Thicknesses of about 9 to about 11 mils are typical.

After applying the mixture to the substrate, it is fired. The particular firing temperature utilized depends upon the softening temperature of a particular glass frit used. Higher firing temperatures generally increase the water resistance of the resulting porcelain enamels; however, higher temperatures also lead to fewer bubbles and tend to increase brittleness. In the present method, the firing temperature is preferably at least about 1000° F. (538° C.); more preferably at least about 1400° F. (760° C.) and most preferably at least about 1550° F. (843° C.). The firing temperature is preferably less than about 1700° F. (927° C.); more preferably less than about 1650° F. (899° C.).

With respect to the zirconia compounds, using finer zircon ($ZrO_2.SiO_2$) and zirconia ($ZrO_2$) has been found to improve the water resistance of the resulting coating. More particularly, zirconia compounds having median particle sizes of less than 100 microns have been found to show significant improvement in terms of water resistance. As used herein, the term "fine zirconia compound" is meant to refer to at least one of zircon ($ZrO_2.SiO_2$), zirconia ($ZrO_2$) or a combination thereof, having a median particle size of less than 10 microns. Preferred median particle sizes of fine zirconia compound may be about 0.1 to 10 microns, while about 0.1 to 5 microns is more preferred, and about 0.3 to 4 microns is most highly preferred. One example of a preferred zirconia compound is Spectrolux® manufactured by Continental Minerals in Cincinnati, Ohio. Spectrolux® is manufactured in four different grades, each of which is determined by median particle size: 1) very fine (0.3 to 4 microns); 2) fine (0.3 to 10 microns); 3) coarse (0.1 to 20 microns); and coarser (greater than 20 microns, but less than 100 microns). The fine and very fine grades of Spectrolux® are preferred.

Using finer-particle-sized zirconia compound allows for more of the zirconia compound to be added to the ground glass. This, in turn, increases the water resistance of the resulting coating as shown in Table 3. The amount of the fine zirconia compound used in the coating may depend on whether a hard, medium or soft frit is being used. Examples of hard frits include, but are not limited to, VS710 manufactured by A. O. Smith. Examples of medium frits include, but are not limited to, VS713 manufactured by A. O. Smith. Examples of soft frits include, but are not limited to, VS756 manufactured by A. O. Smith. Other examples of soft, medium and hard frits include those frits having similar physical and chemical properties as the examples set forth above. Unless otherwise specified, the ranges and ratios are provided below on the basis of parts by weight.

When a hard frit is being used, about 0.001 to about 60 parts by weight fine zirconia compound per about 100 parts by weight ground glass may be used. The term "about" is being used herein to modify the numerical ratios, and reasonably extend the ranges and ratios listed above and below to cover ratios which still result in a water-resistant coating. Generally, at least about 10 parts by weight fine zirconia compound per 100 parts by weight ground glass will be used, although less than this amount may be employed. Preferably, greater than about 10 and less than about 60 parts by weight fine zirconia compound per 100 parts by weight ground glass may be used. In comparison, when silica is employed without a zirconia compound, up to about 80 parts silica by weight per about 100 parts by weight ground glass may be used. Preferably, greater than about 30 parts and less than about 70 parts silica by weight per about 100 parts by weight ground glass will be used in conjunction with a hard frit. When adding a fine zirconia compound and a silica, up to about 100 parts zirconia compound/silica by weight may be added per about 100 parts by weight ground glass. Preferably, greater than about 20 parts and less than about 70 parts fine zirconia compound/silica by weight are added per about 100 parts by weight ground glass.

When a medium frit is being used, about 0.001 to about 90 parts fine zirconia compound per about 100 parts by weight ground glass may be used. Generally, at least about 30 parts fine zirconia compound per 100 parts by weight ground glass will be used. It is possible to use less than this amount, however. Preferably, greater than about 35 to less than about 75 parts by weight of fine zirconia compound per 100 parts by weight ground glass may be used. In comparison, when silica is employed without a zirconia compound, up to about 40 parts silica by weight per about 100 parts by weight ground glass may be used. Preferably, greater than about 35 parts and less than about 75 parts silica by weight per about 100 parts by weight ground glass will be used in conjunction with a medium frit. When adding a fine zirconia compound and a silica, up to 110 parts zirconia compound/silica by weight may be added per about 100 parts by weight ground glass. Generally, greater than 50 parts zirconia compound/silica by weight are added per about 100 parts by weight ground glass. Preferably, greater than about 25 and less than about 75 parts zirconia compound/silica by weight are added per about 100 parts by weight ground glass.

When using a soft frit, the amount of fine zirconia compound per frit can be greatly increased. More specifically, about 0.001 to about 120 parts by weight fine zirconia compound per about 100 parts by weight ground glass may be used. Generally, at least about 30 parts by weight fine zirconia compound per 100 parts by weight ground glass are used, although less zirconia compound may be employed. Preferably, greater than about 30 to less than about 80 parts fine zirconia compound by weight per 100 parts by weight ground glass may be used. In comparison, when silica is employed without a zirconia compound, up to about 100 parts by weight silica may be used per about 100 parts of soft frit. Preferably, greater than about 40 parts and less than about 80 parts silica by weight per about 100 parts by weight ground glass will be used in conjunction with a soft frit. When adding a fine zirconia compound and a silica, up to about 120 parts zirconia compound/silica by weight may be added per about 100 parts by weight ground glass. Generally, greater than about 30 parts zirconia compound/silica by weight are added per about 100 parts by weight ground glass, although less may be used. Preferably, greater than about 30 and less than about 80 parts zirconia compound/silica by weight are added per about 100 parts by weight ground glass.

Overall, the previous ranges and ratios are preferred ranges. Anywhere from about 0.001 to about 120 parts by weight of zirconia per about 100 parts of ground glass may be added to ground glass, regardless of the frit being used. In other words, more zirconia compound may be added to ground glass when a fine zirconia compound is used, regardless of the frit. Consequently, the invention should in no way be limited to the type of frit being used. Generally, the more zirconia used in the frit, the more water resistant the resulting mixture or coating becomes. The previously specified ranges will provide coatings having the best water resistance. In addition, fine zirconia may be used in Examples 1 and 2 set forth below. It should be noted that the higher the level of silica and zirconia compound added to the glass, the higher the temperature at which the coating will need to be fired. Generally firing will occur for about 4 to 10 minutes.

EXAMPLE 1

A borosilicate glass frit is prepared having the following oxide content by weight.

| OXIDE CONTENT OF GLASS FRIT | |
|---|---|
| $Al_2O_3$ | 0.5 |
| $B_2O_3$ | 7.4 |
| BaO | 0.003 |
| CaO | 0.003 |
| CoO | 0.5 |
| CuO | 0.2 |
| $F_2$ | 4.09 |
| $Fe_2O_3$ | 0.05 |
| $K_2O$ | 0.007 |
| $Li_2O$ | 5.2 |
| MnO | 0.9 |
| $Na_2O$ | 17.1 |
| NiO | 0.1 |
| $SiO_2$ | 52.3 |
| $TiO_2$ | 1.1 |
| ZnO | 0.3 |
| $ZrO_2$ | 10.2 |

The frit is ground, and to 1000 parts of frit are added the following mill additions. Parts are given by weight. Weight percent is based on the total weight of the dry mixture of frit and mill additions.

| Mill Addition | Parts | Weight % |
|---|---|---|
| Silica Flour | 400 | 23.7 |
| Zircon | 200 | 11.9 |
| Ball Clay | 75 | 4.5 |
| Bentonite | 3.5 | 0.2 |
| Magnesium Carbonate | 2 | 0.1 |
| Sodium Nitrite | 1 | 0.06 |
| 10 Mol Borax | 4 | 0.2 |

A slip is prepared by mixing the above ingredients with 25-30 weight percent water (based on the total weight of the slip solution). The slip is sprayed onto a steel substrate to a thickness from 30-60 grams dry per square foot of substrate. The sample is then fired to reach temperatures above 1500° F. (816° C.) for about 4 minutes with a maximum temperature of 1650° F. (899° C.). Water resistance of the resulting sample was tested by immersing the sample in a bath of 2% tetrasodium pyrophosphate at 205° F. (96° C.) for 56 days. The area of the porcelain enamel exposed was 5.4 square inches. The 20Zr/40Si coating had a weight loss of 0.09 grams. By comparison, the same area of commercial glass having silica mill additions and no zircon mill additions had a weight loss of 0.28 grams when subjected to the same test conditions.

EXAMPLE 2

A porcelain enamel coating is prepared as described in Example 1 above except the zirconia compound and silica content from the mill additions is as indicated on Table 1 below.

Table 1 shows the results of employing various quantities of silica ($SiO_2$) (represented as Si in Table 1) and zircon ($ZrO_2 \cdot SiO_2$) (represented as Zr in Table 1). The quantities are in parts by weight per 100 parts glass frit.

TABLE 1

| Mill Additions (Parts/100 Parts Frit) | % Bubble Content | Average of eight views: Maximum bubble size in each microscope view | Water Resistance of Coating |
|---|---|---|---|
| 10 Zr/45 Si | 11.3% | 0.0025 mm$^2$ | 0.0093 g |
| 20 Zr/30 Si | 11.3% | 0.0027 mm$^2$ | 0.0068 g |
| 30 Zr/15 Si | 10.5% | 0.0018 mm$^2$ | 0.0091 g |
| Comparative Examples: | | | |
| 60 Si | 15.3% | 0.0058 mm$^2$ | 0.0122 g |
| 30 Zr/60 Si | Inadequate adhesion | | |
| 40 Zr/40 Si | Inadequate adhesion | | |
| 40 Zr | 2.6% | 0.0005 mm$^2$ | 0.0099 g |

Percent bubble content is measured by image analysis of cross-sections of the glass coating. Water resistance is determined by immersing the coated part in a bath of 2% tetrasodium pyrophosphate at 205° F. (96° C.) for 11 days and then measuring weight loss (in grams). A smaller weight loss is preferred. The area of the porcelain enamel exposed for all samples was 5.4 square inches. By comparison, a commercially available water heater glass (having no zircon mill additions) tested under the same conditions was found to have a weight loss of 0.0238 grams; over two times greater weight loss than the improved coating of the present invention.

As shown by the comparative examples, a mill addition containing silica and no zirconia compound leads to poor adhesion and relatively large bubbles. On the other hand, using mill additions with a zirconia compound and no silica compound tends to result in poor fish scale resistance.

Table 1 shows that zircon suppresses bubble or void formation. The compositions having a greater zircon content as a mill addition desirably exhibited a smaller percentage of bubble content and a smaller average bubble size. Surprisingly, when silica is used in combination with zirconia as a mill addition, the relative water resistance of the resulting porcelain enamel is greater than the water resistance of a porcelain enamel made using mill additions of either silica alone or zircon alone. This synergy is most noticeable when silica is present in an amount of 15-45 parts per hundred parts frit while zirconia is present in an amount of approximately 10-30 parts per hundred parts frit.

Listed below are the specific compositions of a number of examples employing a fine zirconia compound, silica or a combination thereof. The numerical values indicate the weight in grams of each component of the compositions. The Examples vary in terms of the type of frit (namely, soft, medium or hard frit) being used. The fine zirconia compound in the Examples being utilized comprises Spectrolux® 6000. The median particle size of the fine zirconia compound in the Examples was about 1.278 microns. The silica in the Examples may comprise Aerosil, which is a fine silica commercially available from Degussa Chemical, Ridgefield Park, N.J., 325 mesh silica commercially available from Short Mountain Silica, Mooresburg, Tenn., or a combination thereof. The other components in the compositions may include PCD #1 Clay commercially available from Kentucky Tennessee Clay Company, Mooresburg, Tenn., PCD #3 Clay commercially available from Old Hickory Clay Company, Hickory, Ky., magnesium carbonate commercially available from Van Waters and Rogers, Cincinnati, Ohio, 10 M Borax obtained commercially available from Van Waters and Rogers, Cincinnati, Ohio, Bentonite commercially available from Van Waters and Rogers, Cincinnati, Ohio, and Bentone EW® commercially available from Rheox, Highttown, JN. The coatings were each fired for about seven minutes at the temperatures specified below. If not specifically listed in the Examples, the temperature at which the firing took place fell within the range the range of about 1500-1650° F. The preferred firing range is 1550 to 1600° F.

EXAMPLE 3

| | |
|---|---|
| VS756 (soft frit) | 1000.00 |
| VS713 (medium frit) | |
| VS710 (hard frit) | |
| 325 mesh silica | |
| PCD #1 Clay | 16.67 |
| PCD #3 Clay | 83.33 |
| Magnesium Carbonate | 1.33 |
| 10 Mol Borax | 5.33 |
| Bentonite | 1.33 |
| Bentone EW | 0.33 |
| Aerosil (fine silica) | |
| Zinc sulfide | 4.00 |
| Spectrolux ® 6000 | 1200.00 |
| WATER | 567.0 |

EXAMPLE 4

| | |
|---|---|
| VS756 (soft frit) | |
| VS713 (medium frit) | 1000.00 |
| VS710 (hard frit) | |
| 325 mesh silica | |
| PCD #1 Clay | 16.67 |
| PCD #3 Clay | 83.33 |
| Magnesium Carbonate | 1.33 |
| 10 Mol Borax | 5.33 |
| Bentonite | 1.33 |
| Bentone EW | 0.33 |
| Aerosil (fine silica) | |
| Zinc sulfide | 4.00 |
| Spectrolux ® 6000 | 1200.00 |
| WATER | 567.0 |

EXAMPLE 5

| | |
|---|---|
| VS756 (soft frit) | 1000.00 |
| VS713 (medium frit) | |
| VS710 (hard frit) | |
| 325 mesh silica | 1000.00 |
| PCD #1 Clay | |
| PCD #3 Clay | |
| Magnesium Carbonate | 1.33 |
| 10 Mol Borox | 5.33 |
| Bentonite | 1.33 |
| Bentone EW | 0.33 |
| Aerosil (fine silica) | 53.33 |
| Zinc sulfide | 4.00 |
| Spectrolux ® 6000 | 200.00 |
| WATER | 567.0 |

EXAMPLE 6

| | |
|---|---|
| VS756 (soft frit) | |
| VS713 (medium frit) | 1000.00 |
| VS710 (hard frit) | |
| 325 mesh silica | 1000.00 |
| PCD #1 Clay | |
| PCD #3 Clay | |
| Magnesium Carbonate | 1.33 |
| 10 Mol Borox | 5.33 |
| Bentonite | 1.33 |
| Bentone EW | 0.33 |
| Aerosil (fine silica) | 53.33 |
| Zinc sulfide | 4.00 |
| Spectrolux ® 6000 | 200.00 |
| WATER | 567.0 |

EXAMPLE 7

| | |
|---|---|
| VS756 (soft frit) | 1000.00 |
| VS713 (medium frit) | |
| VS710 (hard frit) | |
| 325 mesh silica | 1000.00 |
| PCD #1 Clay | |
| PCD #3 Clay | 62.50 |
| Magnesium Carbonate | 1.00 |
| 10 Mol Borox | 4.00 |
| Bentonite | 1.00 |
| Bentone EW | 0.25 |
| Aerosil (fine silica) | |
| Zinc sulfide | 3.00 |
| Spectrolux ® 6000 | |
| WATER | 567.0 |

EXAMPLE 8

| | |
|---|---|
| VS756 (soft frit) | |
| VS713 (medium frit) | 1000.00 |
| VS710 (hard frit) | |
| 325 mesh silica | |
| PCD #1 Clay | |
| PCD #3 Clay | 62.50 |
| Magnesium Carbonate | 1.00 |
| 10 Mol Borox | 4.00 |
| Bentonite | 1.00 |
| Bentone EW | 0.25 |
| Aerosil (fine silica) | |
| Zinc sulfide | 3.00 |
| Spectrolux ® 6000 | |
| WATER | 567.0 |

EXAMPLE 9

| | |
|---|---|
| VS756 (soft frit) | |
| VS713 (medium frit) | |
| VS710 (hard frit) | 1000 |
| 325 mesh silica | |
| PCD #1 Clay | 12.5 |
| PCD #3 Clay | 62.5 |
| Magnesium Carbonate | 1 |
| 10 Mol Borox | 4.00 |
| Bentonite | 1.00 |
| Bentone EW | 0.25 |
| Aerosil (fine silica) | |
| Zinc sulfide | 3.00 |
| Spectrolux ® 6000 | 600.00 |
| WATER | 567.0 |

EXAMPLE 10

| | |
|---|---|
| VS756 (soft frit) | |
| VS713 (medium frit) | |
| VS710 (hard frit) | 1000 |
| 325 mesh silica | 400 |
| PCD #1 Clay | 12.5 |
| PCD #3 Clay | 62.5 |
| Magnesium Carbonate | 1 |
| 10 Mol Borox | 4.00 |
| Bentonite | 1.00 |
| Bentone EW | 0.25 |
| Aerosil (fine silica) | |
| Zinc sulfide | 3.00 |
| Spectrolux ® 6000 | 200.00 |
| WATER | 567.0 |

EXAMPLE 11

| | |
|---|---|
| VS756 (soft frit) | |
| VS713 (medium frit) | 1000.00 |
| VS710 (hard frit) | |
| 325 mesh silica | 359.28 |
| PCD #1 Clay | 3.89 |
| PCD #3 Clay | 44.91 |
| Magnesium Carbonate | 1.20 |
| 10 Mol Borox | 4.79 |
| Bentonite | 1.20 |
| Bentone EW | 0.30 |
| Aerosil (fine silica) | 19.16 |
| Zinc sulfide | 3.59 |
| Spectrolux ® 6000 | 352.10 |
| WATER | 651.50 |

EXAMPLE 12

| | |
|---|---|
| VS756 (soft frit) | |
| VS713 (medium frit) | 1000.00 |
| VS710 (hard frit) | |
| 325 mesh silica | 359.28 |
| PCD #1 Clay | 3.89 |
| PCD #3 Clay | 44.91 |
| Magnesium Carbonate | 1.20 |
| 10 Mol Borox | 4.79 |
| Bentonite | 1.20 |
| Bentone EW | 0.30 |
| Aerosil (fine silica) | 19.16 |
| Zinc sulfide | 3.59 |
| Spectrolux ® 6000 | 352.10 |
| WATER | 651.50 |

EXAMPLE 13

| | |
|---|---|
| VS756 (soft frit) | 1000.00 |
| VS713 (medium frit) | |
| VS710 (hard frit) | |
| 325 mesh silica | 359.28 |
| PCD #1 Clay | 3.89 |
| PCD #3 Clay | 44.91 |
| Magnesium Carbonate | 1.20 |
| 10 Mol Borox | 4.79 |
| Bentonite | 1.20 |
| Bentone EW | 0.30 |
| Aerosil (fine silica) | 19.16 |
| Zinc sulfide | 3.59 |
| Spectrolux ® 6000 | 352.10 |
| WATER | 651.50 |

EXAMPLE 14

| | |
|---|---|
| VS756 (soft frit) | |
| VS713 (medium frit) | |
| VS710 (hard frit) | 1000.00 |
| 325 mesh silica | 200.00 |
| PCD #1 Clay | 12.50 |
| PCD #3 Clay | 62.50 |
| Magnesium Carbonate | 1.00 |
| 10 Mol Borox | 4.00 |
| Bentonite | 1.00 |
| Bentone EW | 0.25 |
| Aerosil (fine silica) | |
| Zinc sulfide | 3.00 |
| Spectrolux ® 6000 | 400.00 |
| WATER | 567.00 |

EXAMPLE 15

| | |
|---|---|
| VS756 (soft frit) | |
| VS713 (medium frit) | 600.00 |
| VS710 (hard frit) | 400.00 |
| 325 mesh silica | 460.00 |
| PCD #1 Clay | 10.00 |
| PCD #3 Clay | 50.00 |
| Magnesium Carbonate | 1.20 |
| 10 Mol Borox | 4.80 |
| Bentonite | 1.20 |
| Bentone EW | 0.30 |
| Aerosil (fine silica) | 16.00 |
| Zinc sulfide | 3.60 |
| Spectrolux ® 6000 | 500.00 |
| WATER | 680.13 |

Table 3 below shows the water resistance of Examples 8-15 compared to standard glass. The water resistance test employed is the same as that set forth in Example 1 above, namely, 205F with 2% tetrasodium pyrophosphate. The first column entitled "Initial Weight Grams" shows the initial weight in grams of each coating after firing. Each of the coatings in Examples 8-15 was introduced into water in order to measure the water resistance of each coating. The next column, "INSPECT 1," shows the weight of the coating upon being inspected after it had been exposed to water for twenty-two days. The column, "INSPECT 2," shows the weight of the coating after being inspected a day later. In each Example, the coating loses weight as some of the material therein is dissolved into the water. The material loss in grams of each coating is shown in the column entitled the same. The total loss in weight of each coating is also listed below. The lower the total weight loss, the better water resistance the coating exhibits. In other words, less weight loss means the coating was less susceptible to the water to which it was exposed. As shown below, all of the coatings including the fine zirconia exhibit better water resistance than standard glass having 35 percent silica mill additions with no zircon.

TABLE 3

STANDARD GLASS-FINE 4/4/02 ZIRCONIA/GLASS COMPARISON
Weights in grams

| Panel ID | Initial weight grams | INSPECT 1 | Elec Leak per 10 | Material Loss 22 days | Loss 1 day | INSPECT 2 | Total loss | Example | Firing Temperature |
|---|---|---|---|---|---|---|---|---|---|
| 713 A1 | 214.3309 | 214.2951 | 0 | 0.0358 | 0.0079 | 214.2872 | 0.0437 | | |
| 713 A2 | 211.7238 | 211.6571 | 0 | 0.0667 | 0.0081 | 211.649 | 0.0748 | 0.0593 Standard Glass | |
| TY038 G1 | 248.3432 | 248.2297 | 0 | 0.1135 | −0.0626 | 248.2923 | 0.0509 | | |
| TY038 G2 | 243.8296 | 243.8019 | 0 | 0.0277 | 0.0065 | 243.7954 | 0.0342 | 0.0425 Example 8 | |
| TY038 H1 | 213.5790 | 213.5392 | 0 | 0.0398 | 0.0076 | 213.5316 | 0.0474 | | |
| TY038 H2 | 215.5564 | 215.5242 | 0 | 0.0322 | 0.0073 | 215.5169 | 0.0395 | 0.0435 Example 9 | 1560° F. Firing |

TABLE 3-continued

STANDARD GLASS-FINE 4/4/02
ZIRCONIA/GLASS COMPARISON
Weights in grams

| Panel ID | Initial weight grams | INSPECT 1 | Elec Leak per 10 | Material Loss 22 days | Loss 1 day | INSPECT 2 | Total loss | | Example | Firing Temperature |
|---|---|---|---|---|---|---|---|---|---|---|
| TY038 H4 | 175.5003 | 175.4755 | 0 | 0.0248 | 0.0069 | 175.4686 | 0.0317 | | | |
| TY038 H5 | 216.9144 | 216.8905 | 0 | 0.0239 | 0.0097 | 216.8808 | 0.0336 | 0.0327 | Example 10 | 1600° F. Firing |
| TY038 J1 | 246.3199 | 246.3065 | 0 | 0.0134 | 0.0062 | 246.3003 | 0.0196 | | | |
| TY038 J2 | 245.2854 | 245.2683 | 0 | 0.0171 | 0.0081 | 245.2602 | 0.0252 | 0.0224 | Example 11 | 1560° F. Firing |
| TY038 K1 | 242.5170 | 242.4994 | 0 | 0.0176 | 0.0063 | 242.4931 | 0.0239 | | | |
| TY038 K2 | 247.0678 | 247.0467 | 0 | 0.0211 | 0.0100 | 247.0367 | 0.0311 | 0.0275 | Example 12 | 1600° F. Firing |
| TY038 L1 | 247.8037 | 247.7682 | 0 | 0.0355 | 0.0078 | 247.7604 | 0.0433 | | | |
| TY038 L2 | 248.5025 | 248.4688 | 0 | 0.0337 | 0.0114 | 248.4574 | 0.0451 | 0.0442 | Example 13 | |
| TY038 M1 | 213.5972 | 213.5658 | 0 | 0.0314 | 0.0123 | 213.5535 | 0.0437 | | | |
| TY038 M2 | 165.8471 | 165.8350 | 0 | 0.0121 | 0.0066 | 165.8284 | 0.0187 | 0.0312 | Example 14 | |
| TY038 N1 | 243.7572 | 243.7384 | 0 | 0.0188 | 0.0061 | 243.7323 | 0.0249 | | | |
| TY038 N2 | 209.7073 | 209.6832 | 0 | 0.0241 | 0.0073 | 209.6759 | 0.0314 | 0.0281 | Example 15 | |

What is claimed is:

1. A method of manufacturing water-resistant porcelain enamel coating suitable for use on a water heater, the method comprising:
   providing ground glass;
   adding mill additions to the ground glass to form a mixture, wherein the mill additions comprise silica and a zirconia compound;
   applying the mixture to a water heater; and
   firing the water heater to form the water-resistant porcelain enamel coating, wherein the silica and zirconia compound mill additions comprise at least about 25 and less than about 70 parts by weight per hundred parts by weight ground glass sufficient that the water-resistant coating resists cracking.

2. The method of claim 1 wherein the ground glass is provided by grinding a glass system.

3. The method of claim 1 wherein the ground glass comprises a sodium borosilicate glass.

4. The method of claim 1 wherein the zirconia compound comprises zircon ($ZrO_2.SiO_2$) or zirconia ($ZrO_2$).

5. The method of claim 1 wherein the mixture comprises from about 15 to about 50 parts by weight of the silica mill addition per hundred parts by weight of the ground glass.

6. The method of claim 1 wherein the mixture comprises at least about 10 parts by weight of the zirconia compound mill addition per hundred parts by weight of the ground glass.

7. The method of claim 1 wherein the mill additions further comprise a clay.

8. The method of claim 1 wherein the coated substrate is fired at a temperature of about 1000 to about 1700° F. (538-927° C.).

9. The method of claim 1 wherein the coated substrate is fired at a temperature of about 1550 to about 1600° F. (843-899° C.).

10. The method of claim 1 wherein the ground glass comprises:
   about 52 weight percent SiO2,
   about 17 weight percent Na2O,
   about 10 weight percent ZrO2,
   less than about 4.1 weight percent F2,
   less than about 0.005 weight percent CaO, and
   greater than about 4.1 weight percent $Li_2O$.

11. The method of claim 1, wherein the zirconia compound has a median particle size, and the median particle size is less than about 10 microns.

12. A method of manufacturing a water-resistant porcelain enamel coating suitable for use on a water heater, the method comprising:
   providing a ground borosilicate glass;
   adding mill additions to the ground glass to form a mixture, wherein the mill additions comprise (a) a zirconia compound constituting at least about 10 parts by weight per hundred parts by weight ground glass and (b) a silica compound;
   applying the mixture to a water heater; and
   firing the water heater at a temperature of about 1000° F. to about 1700° F. to form the water-resistant porcelain enamel coating.

13. The method of claim 12 wherein the zirconia compound comprises zircon ($ZrO_2.SiO_2$) or zirconia ($ZrO_2$).

14. The method of claim 12 wherein the mixture comprises from about 15 to about 50 parts by weight of the silica compound mill addition and from about 10 to about 30 parts by weight of the zirconia compound mill addition per 100 parts by weight of the ground glass.

15. A method of manufacturing a water-resistant porcelain enamel coating suitable for use on a water heater, the method comprising:
   providing ground glass;
   adding mill additions to the ground glass to form a mixture, wherein the mill additions comprise silica and a zirconia compound and wherein the mixture comprises at least about 15 parts and less than about 60 parts by weight of the silica mill addition per hundred parts by weight of the ground glass;
   applying the mixture to a water heater; and
   firing the water heater at a temperature of about 1000 to 1700° F. (538-927° C.) to form the water-resistant porcelain enamel coating that resists cracking.

16. The method of claim 15, wherein the zirconia compound has a median particle size, and the median particle size is less than about 10 microns.

17. A method of manufacturing a water-resistant porcelain enamel coating suitable for use on a water heater, the method comprising:

adding mill additions to ground glass to form a mixture, wherein the mill additions comprise a zirconia compound;

applying the mixture to a water heater; and firing the water heater to form the water-resistant porcelain enamel coating.

18. The method of claim 17, wherein the zirconia compound has a median particle size of less than about 100 microns.

19. The method of claim 17, wherein the zirconia compound has a median particle size of less than about 10 microns.

20. The method of claim 17, wherein the zirconia compound has a median particle size of about 0.1 to 10 microns.

21. The method of claim 17, wherein the zirconia compound has a median particle size of about 0.1 to 5 microns.

22. The method of claim 17, wherein the zirconia compound has a median particle size of about 0.3 to 4 microns.

23. The method of claim 17, wherein the zirconia compound mill additions comprise a fine zirconia up to about 60 parts by weight per 100 parts ground glass.

24. The method of claim 17, wherein the zirconia compound mill additions comprise a fine zirconia at about 10 to about 60 parts by weight per 100 parts ground glass.

25. The method of claim 17, wherein the zirconia compound mill additions comprise a fine zirconia up to about 90 parts by weight per 100 parts ground glass.

26. The method of claim 25, wherein the zirconia compound mill additions comprise a fine zirconia at about 35 to 75 parts by weight per 100 parts ground glass.

27. The method of claim 17, wherein zirconia compound mill additions comprise a fine zirconia up to about 120 parts by weight per 100 parts by weight ground glass.

28. The method of claim 27, wherein the zirconia compound mill additions comprise a fine zirconia at about 30 to 100 parts by weight per 100 parts by weight ground glass.

29. The method of claim 17, wherein the substrate is at least a portion of a water heater.

30. The method of claim 17, wherein the portion of the water heater is an internal portion of the water heater, and the coating contacts water in the water heater.

31. The method of claim 17, wherein the mixture comprises up to about 120 parts by weight fine zirconia compound per about 100 parts by weight ground glass.

32. The method of claim 17, wherein the mixture comprises about 10 to about 80 parts by weight fine zirconia compound per about 100 parts by weight ground glass.

33. The method of claim 17, wherein the mill additions further comprise silica.

34. The method of claim 33, wherein the mixture comprises at least about 20 and less than about 120 parts by weight of a fine zirconia compound and silica per hundred parts by weight ground glass.

35. The method of claim 23, wherein the firing occurs at a temperature from about 1000° F. to about 1700° F.

36. The method of claim 17, wherein the zirconia compound comprises at least one of zircon ($ZrO_2.SiO_2$), zirconia ($ZrO_2$), and a combination thereof.

37. The method of claim 17, wherein the firing occurs at a temperature from about 1000° F. to about 1700° F.

38. The method of claim 17, wherein the zirconia compound mill additions comprise at least about 30 parts by weight of a fine zirconia compound per about 100 parts of ground glass.

39. The method of claim 17, wherein the zirconia compound mill additions comprise at least about 10 parts by weight of zirconia per about 100 parts of ground glass.

40. A method of manufacturing a water-resistant porcelain enamel coating suitable for use on a water heater, the method comprising:

adding a zirconia compound and silica to ground glass to form a mixture;

applying the mixture to a water heater; and firing the water heater to form the water-resistant porcelain enamel coating, wherein the mixture comprises at least about 10 parts by weight zirconia compound per hundred parts by weight ground glass, and wherein the water-resistance of the coating is improved compared to a similar coating not comprising silica and at least about 10 parts by weight zirconia compound.

41. The method of claim 40, wherein the zirconia compound has a median particle size, and the median particle size is less than about 10 microns.

42. The method of claim 40, wherein the mixture comprises at least about 20 and less than about 100 parts by weight of fine zirconia compound and silica per hundred parts by weight ground glass.

43. The method of claim 40, wherein the firing occurs at a temperature from about 1000° F. to about 1700° F.

44. The method of claim 40, wherein fine zirconia compound comprises at least one of zircon ($ZrO_2.SiO_2$), zirconia ($ZrO_2$), and a combination thereof.

45. The method of claim 40, wherein the substrate is steel.

46. The method of claim 40, wherein the substrate is at least a portion of a water heater.

47. The method of claim 46, wherein the portion of the water heater is an internal portion of the water heater and the coating contacts water in the water heater.

48. The method of claim 40, wherein the zirconia compound mill additions comprise a fine zirconia at at least about 10 and less than about 120 parts by weight per hundred parts by weight ground glass.

49. The method of claim 48, wherein the zirconia compound mill additions comprise a fine zirconia at at least about 20 and less than about 100 parts by weight per hundred parts by weight ground glass.

* * * * *

UNITED STATES PATENT AND TRADEMARK OFFICE
CERTIFICATE OF CORRECTION

PATENT NO.        : 7,410,672 B2
APPLICATION NO.   : 10/190957
DATED             : July 8, 2008
INVENTOR(S)       : James D. Waters et al.

Page 1 of 1

It is certified that error appears in the above-identified patent and that said Letters Patent is hereby corrected as shown below:

In Claim 9, Col. 13 line 57:

change "1600° F." to --1650° F.--

Signed and Sealed this

Twenty-seventh Day of January, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,410,672 B2                          Page 1 of 1
APPLICATION NO.    : 10/190957
DATED              : August 12, 2008
INVENTOR(S)        : James D. Waters et al.

It is certified that error appears in the above-identified patent and that said Letters Patent is hereby corrected as shown below:

In Claim 9, Col. 13 line 57:

change "1600° F." to --1650° F.--

This certificate supersedes the Certificate of Correction issued January 27, 2009.

Signed and Sealed this

Seventeenth Day of February, 2009

JOHN DOLL
*Acting Director of the United States Patent and Trademark Office*